United States Patent [19]

Hino

[11] Patent Number: 4,739,365
[45] Date of Patent: Apr. 19, 1988

[54] DEVELOPING UNIT FOR AN ELECTRO-PHOTOGRAPHIC APPARATUS

[75] Inventor: Toshio Hino, Tokyo, Japan

[73] Assignee: Fujitsu Limited, Kawasaki, Japan

[21] Appl. No.: 55,038

[22] Filed: May 28, 2987

[30] Foreign Application Priority Data

Jun. 13, 1986 [JP] Japan ................. 61-136192

[51] Int. Cl.⁴ .................................. G03G 15/08
[52] U.S. Cl. ..................... 355/14 D; 355/3 DD; 118/688; 118/691
[58] Field of Search ............. 355/140, 3 DD, 3 TR, 355/14 TR, 3 R, 14 R; 118/688, 691

[56] References Cited

U.S. PATENT DOCUMENTS

| | | | |
|---|---|---|---|
| 4,416,535 | 11/1983 | Tottori | 355/14 D |
| 4,451,135 | 5/1984 | Okumura | 355/3 DD |
| 4,536,080 | 8/1985 | Hauser et al. | 355/14 D |
| 4,550,998 | 11/1985 | Nishikawa | 355/3 DD |
| 4,551,002 | 11/1985 | Aoki et al. | 355/3 DD |

Primary Examiner—A. C. Prescott
Attorney, Agent, or Firm—Staas & Halsey

[57] ABSTRACT

A developing unit for an electro-photographic apparatus is described, including a toner concentration sensor provided between a paddle roller and a developing roller near the bottom of the casing. The sensor generates a toner concentration signal with high sensitivity but without substantial fluctuation.

12 Claims, 4 Drawing Sheets

DEVELOPING UNIT FOR AN ELECTRO-PHOTOGRAPHIC APPARATUS

BACKGROUND OF THE INVENTION

The present invention relates to a developing unit for an electro-photographic apparatus, such as a copier or a printer. More specifically, the present invention relates to a toner concentration sensor for the developing unit.

An electro-photographic apparatus generally includes a latent image forming drum coated with photosensitive material, a developing unit for developing the latent image into a visible image, and means for fixing the developed image onto paper.

The developing unit generally includes: a casing for containing developer, which is a mixture of a carrier and toner; a paddle roller for paddling the developer; a developing roller for carrying the developer to the latent image forming drum, and a toner concentration sensor for sensing and controlling the toner concentration of the developer and maintaining adequate developing quality.

In a conventional electro-photographic apparatus, the sensor is provided on a blade which regulates the thickness of the layer of developer disposed on the developing roller. One of the reasons the sensor is provided on the blade is that the sensor should sense the developer actually being supplied to the developing roller, i.e., as the developer is paddled up by the paddle roller and poured onto the developing roller. The developer scraped off by the blade must be of the same concentration as the developer actually used for the development of the latent image. Therefore, it is logical that measurement at the blade should accurately reflect the developing quality.

However, it has been found that the output signal of the sensor provided at the blade is insufficient for accurate control of the toner concentration. More particularly, the output of the sensor fluctuates according to fluctuation of flow of the developer at the blade.

SUMMARY OF THE INVENTION

Therefore, it is an object of this invention to provide a developing unit with means for accurately sensing and controlling the toner concentration.

Another object of this invention is to provide a developing unit with a toner concentration sensor which accurately outputs a signal without any fluctuation.

To achieve the foregoing and other objects of the present invention and in accordance with the purposes of the invention, there is provided a developing unit for an electro-photographic apparatus. The developing unit includes: a casing for containing the developer; a paddle roller for paddling the developer; a developing roller for carrying the developer to the photosensitive material; and a sensor for sensing the toner concentration of the developer, the sensor being provided between the paddling roller and the developing roller near the bottom of the casing. As a result of this structure, the toner concentration can be sensed accurately and without fluctuation.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
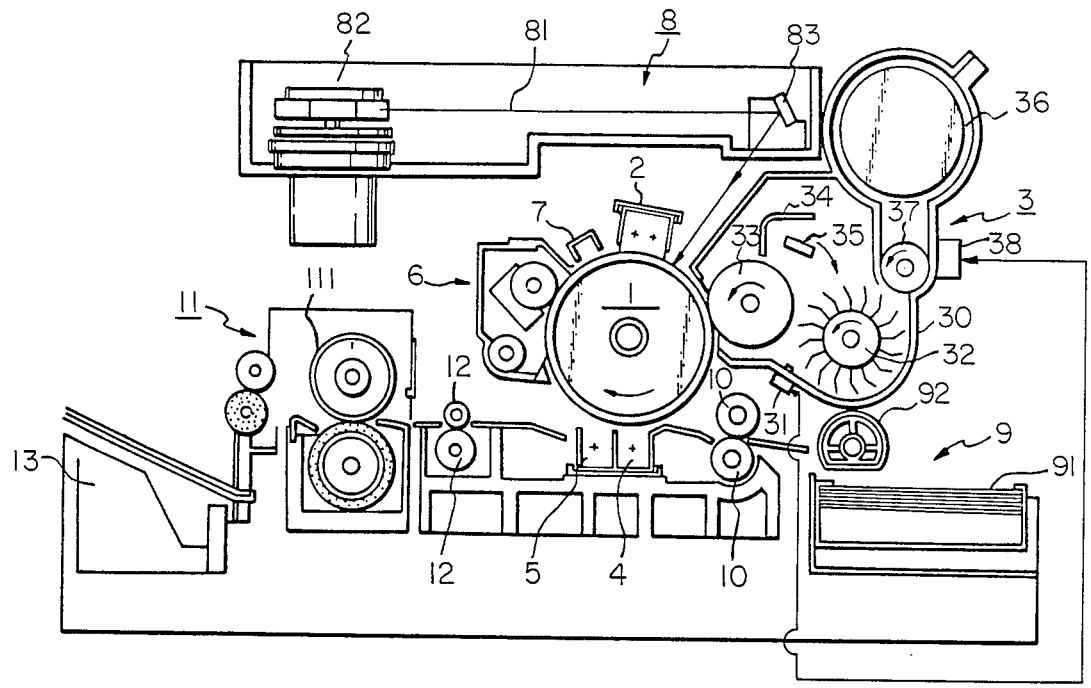
FIG. 1 is a schematic side view of an electro-photographic apparatus according to the present invention.

FIG. 1 is a schematic side view of an electro-photographic apparatus according to the present invention, in this instance a printer. In FIG. 1, a latent image forming drum 1 is shown which is coated on its outer surface with photosensitive material and rotated in the clockwise direction at a predetermined speed. The drum 1 is surrounded by a coronacharger 2, a developing unit 3, an image transferring discharger 4, a paper separating discharger 5, a cleaner 6, and a decharger 7. The photosensitive surface of the latent image forming drum 1 is uniformly charged by the charger 2, then scanned by a light beam 81 supplied by an optical system 8 for forming an electrostatic latent image.

The optical system 8 includes a laser source (not illustrated), an optical shutter (not illustrated), a polygon mirror 82 for scanning, and a reflection mirror 83. The latent image is then developed by the toner supplied by the developing unit 3. A sheet of paper 91 is taken out from a paper cassette 9 by a pick roller 92, and fed to the drum 1 by a pair of feed rollers 10. The developed image, i.e., a toner image, is transferred onto the paper 91 by the image transferring discharger 4. The paper 91 bearing the toner image is separated from the drum 1 by the paper separating discharger 5, and fed to a fixing unit 11 through another pair of feed rollers 12. The fixing unit 11 has a heat roller 111 for thermally fixing the toner image on the paper 91. Then the paper 91 including the image is stacked on a stacker 13. The drum 1 is further rotated, cleaned by the cleaner 6, decharged by the decharger 7, and again uniformly charged by the charger 2 for the next latent image forming.

The developing unit 3 includes: a casing 30 for containing the developer; a toner concentration sensor 31; a paddle roller 32; a developing roller 33; a regulating blade 34; a flow restricting plate 35; a toner hopper 36; a toner supply roller 37; and a toner concentration controller 38 which controls the rotation of the toner supply roller 37 in response to an output signal from the sensor 31. The above-described arrangement, except the position of the sensor 31, is known.

The operation of the developing unit 3 is explained in detail with reference to FIG. 2. In this Figure, the tiny dots indicate the developer 40 which is a mixture of the carrier and the toner, as known in the art. The carrier consists of microscopic grains of magnetic material. The toner is a powder of carbon-based plastics. The developer 40 is paddled and mixed by the paddle roller 32 and, at the same time, scooped up and poured onto the developing roller 33. Inside the developing roller 33, conventional magnets are provided at specific positions, so that the carrier of the developer 40 (together with the toner) is attracted to the surface of the developing roller 33 by the magnetic force. The extra developer 40 on the developing roller 33 is scraped off by the blade 34 and returns to the paddle roller 32 by flowing over the plate 35 as indicated by arrow R in FIG. 2. The developer 40 on the developing roller 33, which is made into a specific thickness, is then carried to the latent image forming drum 1 while the developing roller 33 is rotated. The above-mentioned magnets are not rotated.

The toner touching the latent image forming drum 1 is transferred onto the drum 1 by an electrostatic force, while the carrier remains on the developing roller 33 surface by the magnetic force. As the carrier on the developing roller comes to a place where there is no magnetic force, the carrier is released from the developing roller 33 and falls to the bottom of the casing 30 together with the remaining toner that was not used for development. The bunch of carrier grains accumulated on the developing roller 33 is usually called a "magnetic brush" for painting the drum 1 with the toner.

Figure 2:
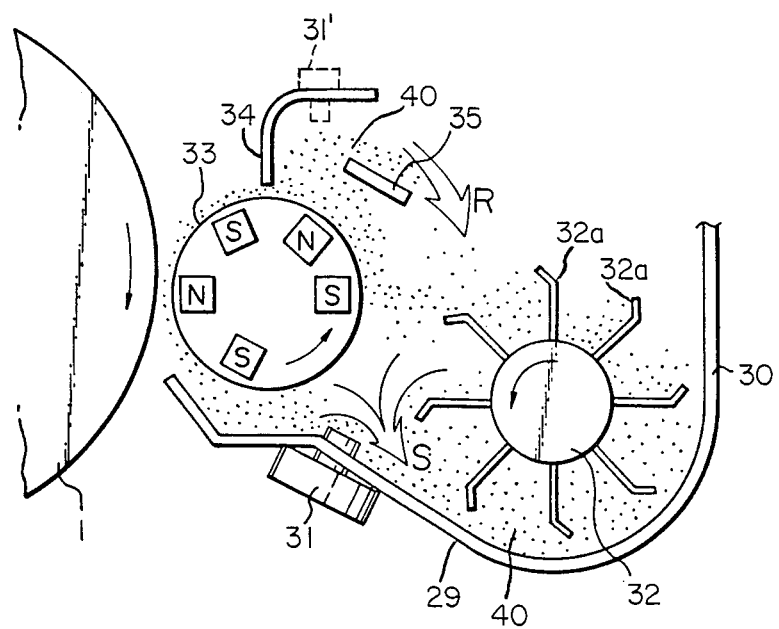
FIG. 2 is a partially enlarged view of the apparatus of FIG. 1.

In the conventional electro-photographic apparatus, a toner concentration sensor 31' is positioned at the blade 34 as shown by a dotted line in FIG. 2. This position is chosen, as mentioned before, because of an intention to measure the concentration of the developer 40 actually supplied to the developing roller 33. The actual flow of the developer 40, however, fluctuates due to the fact that the developer 40 is supplied occasionally, rather than continuously, by each of the paddle fins 32a of the paddle roller 32. Namely, the amount of extra developer 40 scraped off by the blade 34 and returned to the paddle roller 32 flowing above the flow restricting plate 35 varies with time. As the toner concentration sensor 31' usually senses the magnetic reluctance, or its inverse value admittance, the sensor output represents not only the concentration, namely a proportion of the toner to the carrier, but also the variation in the quantity thereof.

The present invention accomplishes a more accurate reading of toner concentration by providing the sensor 31 between the paddle roller 32 and the developing roller 33 and near the bottom 29 of the casing 30, as illustrated in FIG. 2.

The reason this position is superior can be explained as follows. Near the bottom of the casing 30, there is always a large accumulation of the developer 40, i.e., there is no fluctuation in quantity. And in between the paddle roller 32 and the developing roller 33, there occurs a mixture of returned developer 40 from the developing roller 33, which reflects a toner consumption at the developing roller 33, and the developer 40 which has been paddled falling to the bottom of the casing 30, as indicated by arrow S in FIG. 2. The nearer to the developing roller 33 the sensor 31 is provided, the more sensitive to the instantaneous toner consumption the output signal will be. The preferred sensitivity may be selected by choosing the position in between the two rollers 32 and 33.

Figure 3:
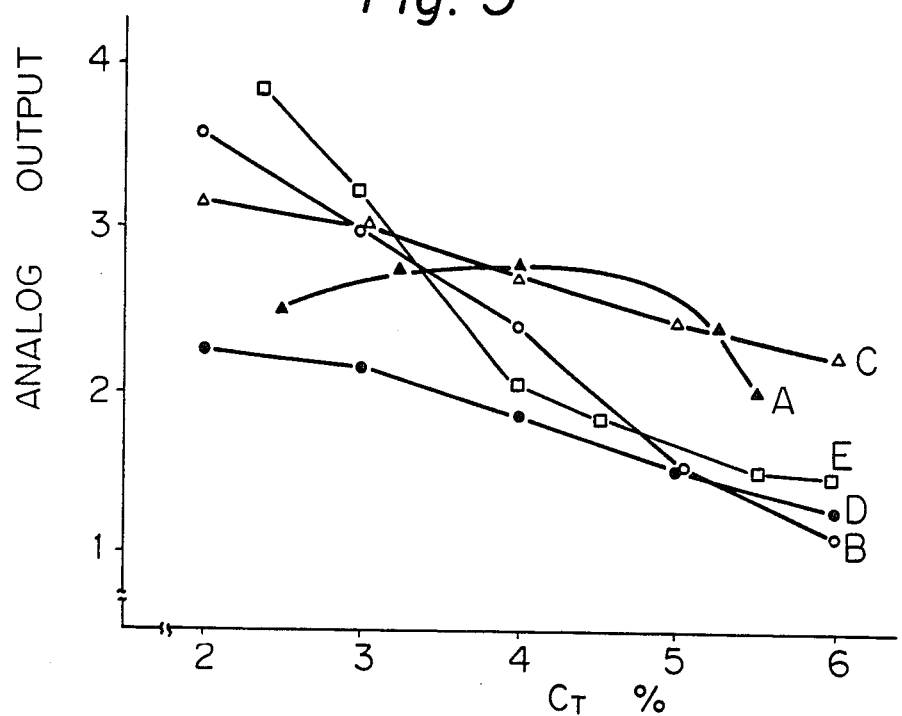
FIG. 3 is a graph showing a relation between sensor outputs and actual toner concentration.
Figure 4:
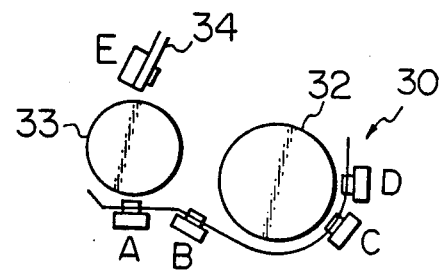
FIG. 4 is a schematic view illustrating several positions of a toner concentration sensor relative to the apparatus.

FIG. 3 shows a comparison of output signals from a plurality of sensors, each provided at a position A, B, C, D or E, respectively, as illustrated in FIG. 4. In FIG. 3, the vertical axis denotes an analog output level of the sensors which is proportional to the magnetic admittance of the developer 40. When the toner concentration decreases, the proportion of the magnetic material, i.e., the carrier, increases, and then the output level increases. The horizontal axis denotes the actual toner concentration.

The sensors are so adjusted that their outputs would be 2.5 V at the concentration of 4%. The measured values at every position A-E exhibit some fluctuation more or less (see FIG. 3 and explanation below). The plotted values in FIG. 3 are averages of a certain period of time at each point. The curve A is not proportional to the concentration, perhaps because the absolute quantity of the developer 40 at position A is too small. The signals from A are much more amplified than the others. The curve B is very proportional to the toner concentration and its tilt is steep. The curves C and D are also proportional to the concentration, but their tilts are less steep. The curve E could be said to be proportional to the concentration, but not straightly proportional.

Figure 5:
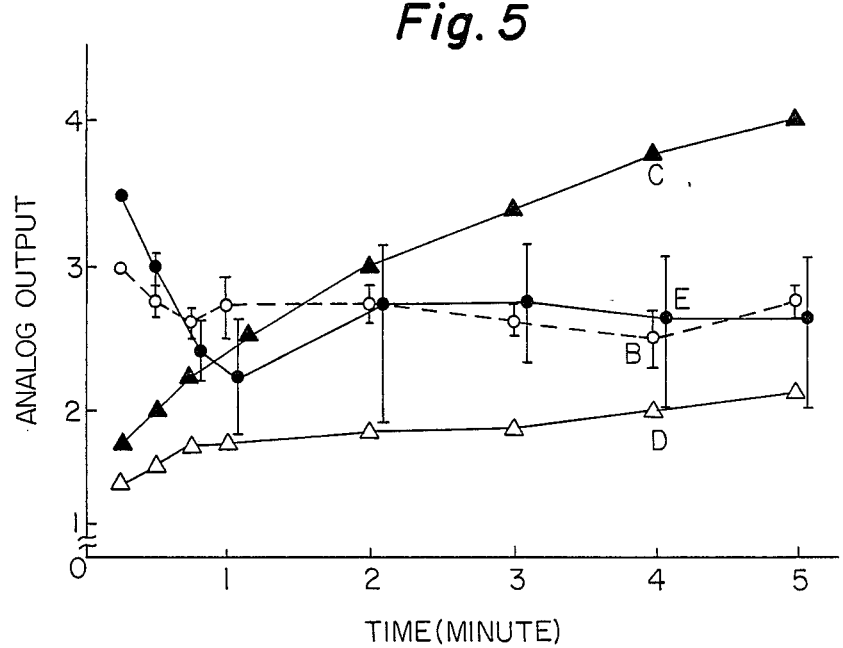
FIG. 5 is a graph showing a relation between sensor outputs and time.

FIG. 5 shows the fluctuations of the output signals from sensors at positions B-E. The vertical axis denotes the analog output level and the horizontal axis denotes time. The curve A is not illustrated for simplicity, because it is not proportional to the concentration and is useless. The vertical segments on the curves B and E indicate regions of fluctuations. For the curves C and D, there is no indication of fluctuations; these outputs are less useful, however, since they increase as time passes. This dependence on time is a disadvantage for a quick start of the apparatus. The reason curves C and D depend on time is unknown. The curves B and E have peaks at the start. This may be due to the fact that the developer 40 is tightly concentrated at the bottom of the casing 30 before starting the apparatus, while the developer 40 is paddled and mixed with air after starting. Mixture with air provides the same effect as high concentration of the toner since both mean less magnetic admittance. Such peaks can be removed in the control circuit and create no substantial problem. The fluctuation of the curve B is much less than that of the curve E.

Figure 6:
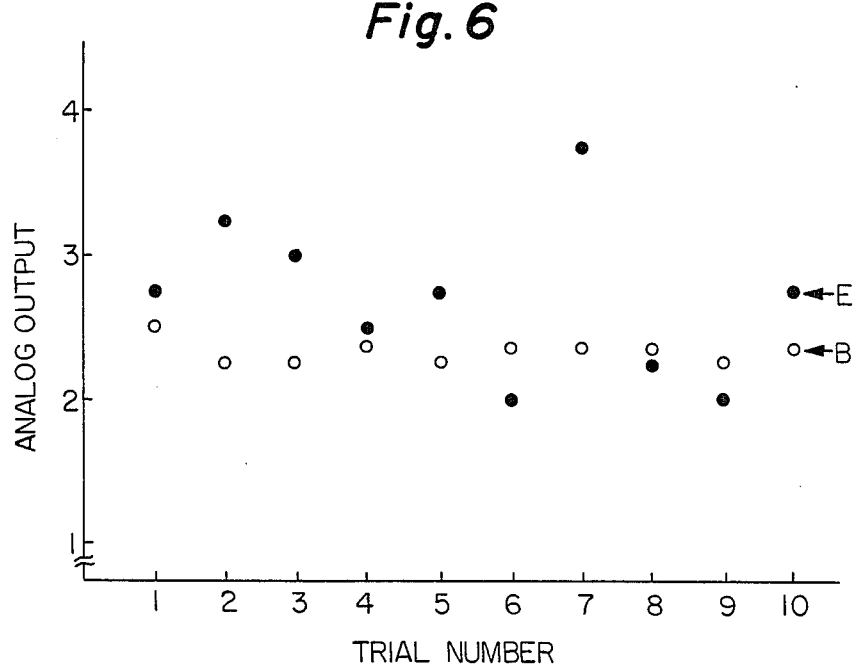
FIG. 6 is a graph showing fluctuations of sensor outputs.

FIG. 6 also shows the fluctuations in a different way. The vertical axis denotes the output analog level and the horizontal axis denotes trial numbers. Namely, the measurement trial was carried out ten (10) times, and each time the measured values were plotted. Each trial includes two (2) minutes of continuous rotation of the rollers 32 and 33, and a five (5) minute recess. The plotted value is an average value of each two minute operation period. As apparent from this Figure, the output E fluctuates significantly on each trial, while the output B hardly fluctuates.

Figure 7:
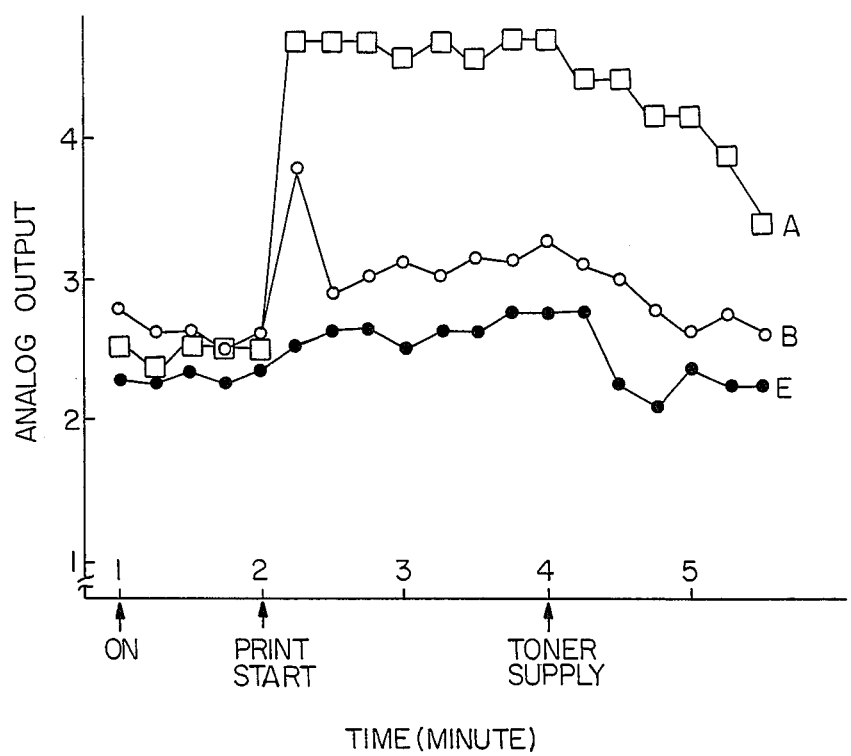
FIG. 7 is a graph showing response characteristics of sensor outputs.

FIG. 7 further shows a response characteristic of the sensors 31 to the toner consumption at the developing roller 33. The vertical axis denotes the output analog level and the horizontal axis denotes time, wherein a printing starts at the two minute time point, and the toner is supplied at the four minute time point. In the measurement of A, the thickness of the developer on the developing roller 33 is made greater than that of B and E, because the output signal is too small and too much fluctuating would occur if the thickness was the same. The output A is too sensitive to the instantaneous consumption of the toner, and is likely to cause a toner shortage signal even if enough toner is present at the paddle roller 32.

From these experimental results, it is concluded that the sensor provided at position B, namely near the bottom of the casing between the rollers 32 and 33, provides the best performance for toner concentration control.

The foregoing is considered illustrative only of the principles of this invention. Further, since numerous modifications and changes will readily occur to those skilled in the art, it is not desired to limit the invention to the exact construction and operation shown and described. For example, the paddling roller 32 may be replaced by another type of device, such as a vibrating plate or a screw, etc. Further, although it is less convenient, the toner supply roller 37 and the toner concentration controller 38 may be replaced by a manually operated supply mechanism and a toner shortage alarm indicator, to create a less expensive apparatus. Accordingly, all suitable modifications and equivalents may be resorted to, falling within the scope of the invention and the appended claims.

What I claim is:

1. A developing unit for developing a latent image formed on a photosensitive material, comprising:
    (a) a casing for containing developer composed of a mixture of magnetic carrier and nonmagnetic toner;
    (b) paddle means, provided adjacent a bottom of the casing, for paddling the developer;
    (c) developing means for carrying the developer from the casing to the photosensitive material by magnetic force and for returning extra developer to the casing; and
    (d) means, provided between the paddling means and the developing means near the bottom of the casing, for sensing a proportion of the toner relative to the carrier and outputting a signal representing the proportion.

2. The developing unit as recited in claim 1, further comprising:
    (e) means for supplying toner into the casing; and
    (f) means for controlling the toner supply means in response to the signal ouput from the toner sensing means.

3. The developing unit as recited in claim 1, wherein the paddle means is a rotatable paddle roller having a plurality of paddle fins on its circumference.

4. The developing unit as recited in claim 1, wherein the developing means is a developing roller having magnetic means therein for providing magnetic force at selected circumferential portions thereof for selectively attracting and releasing the carrier and toner.

5. The developing unit as recited in claim 1, wherein the toner sensing means senses a magnetic admittance of the developer.

6. The developing unit as recited in claim 4, further comprising:
    (g) means for regulating a thickness of a layer of the developer attracted onto the developing roller.

7. The developing unit as recited in claim 6, wherein the regulating means is a blade provided adjacent the surface of the developing roller.

8. The developing unit as recited in claim 2, wherein the paddle means is a rotatable paddle roller having a plurality of paddle fins on its circumference.

9. The developing unit as recited in claim 2, wherein the developing means is a developing roller having magnetic means therein for providing magnetic force at selected circumferential portions thereof for selectively attracting and releasing the carrier and toner.

10. The developing unit as recited in claim 2, wherein the toner sensing means senses a magnetic admittance of the developer.

11. The developing unit as recited in claim 9, further comprising:
    means for regulating a thickness of a layer of the developer attracted onto the developing roller.

12. The developing unit as recited in claim 11, wherein the regulating means is a blade provided adjacent the surface of the developing roller.

* * * * *